United States Patent
Liu

(10) Patent No.: US 8,078,305 B2
(45) Date of Patent: Dec. 13, 2011

(54) NUMERICAL CONTROL ARRANGEMENT

(75) Inventor: Shengming Liu, Artesia, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 369 days.

(21) Appl. No.: 12/050,812

(22) Filed: Mar. 18, 2008

(65) Prior Publication Data

US 2008/0281459 A1  Nov. 13, 2008

Related U.S. Application Data

(60) Provisional application No. 60/896,702, filed on Mar. 23, 2007.

(51) Int. Cl.
*G06F 19/00* (2011.01)

(52) U.S. Cl. .................................. 700/115; 219/121.72

(58) Field of Classification Search .................... 700/86, 700/160, 165, 115, 145; 219/118, 121.72
See application file for complete search history.

(56) References Cited

U.S. PATENT DOCUMENTS

| | | | | |
|---|---|---|---|---|
| 4,061,098 A * | 12/1977 | Horie et al. | ...................... | 72/352 |
| 4,912,644 A | 3/1990 | Aoyama et al. | | |
| 5,971,589 A | 10/1999 | Hazama et al. | | |
| 6,003,358 A * | 12/1999 | Lipari et al. | ...................... | 72/404 |
| 6,144,896 A | 11/2000 | Kask et al. | | |
| 6,256,547 B1 * | 7/2001 | Tognon | ............................ | 700/97 |
| 6,507,767 B2 * | 1/2003 | Bourne et al. | .................. | 700/165 |
| 7,197,372 B2 * | 3/2007 | Hazama | ........................ | 700/165 |
| 7,266,419 B2 * | 9/2007 | Sakai et al. | .................... | 700/145 |
| 7,398,129 B2 | 7/2008 | Ishii et al. | | |
| 2002/0038163 A1 * | 3/2002 | Hazama | ........................ | 700/165 |
| 2005/0071030 A1 | 3/2005 | Itoh | | |
| 2005/0140670 A1 | 6/2005 | Wu et al. | | |
| 2006/0089747 A1 | 4/2006 | Sakai | | |

FOREIGN PATENT DOCUMENTS

| | | |
|---|---|---|
| EP | 0 902 344 A2 | 3/1999 |
| EP | 1 657 607 A2 | 5/2006 |
| JP | 11-085833 | 3/1999 |
| JP | 11-169952 | 6/1999 |
| WO | WO 2006038733 A2 | 4/2006 |

OTHER PUBLICATIONS

Cheung-Hua Wang, et al., "BendCad: a design system for concurrent multiple representations of parts", Journal of Intelligent Manufacturing, 1996, p. 133-144.

"COPRA MetalBender 3D", www.copra-metalbender.com, Jun. 8, 2010, 3 pages.

Leila De Floriani, "Feature Extraction from Boundary Models of Three-Dimensional Objects", IEEE Transactions on Pattern Analysis and Machine Intelligence, vol. 11, No. 8, Aug. 1989, p. 785-798.

"AutoPOL 7 Software", www.autopol.com, 2010, 1 page.

(Continued)

*Primary Examiner* — Kidest Bahta

(57) ABSTRACT

A numerical control arrangement, comprising a sheet metal data file defining a part blank having a plurality of position elements from a processed design file; a machine controller comprising tool-related operations and control data from said sheet metal data file defining a plurality of position elements, the operations and position elements being associated with machining tasks; and a machine controlled by said machine controller to form a sheet metal part and appropriate means and computer-readable instructions.

13 Claims, 7 Drawing Sheets

OTHER PUBLICATIONS

W. Liu, et al., "Optimal design of flat patterns for 3D folded structures by unfolding with topological validation", Computer-Aided Design, vol. 39, May 25, 2007, p. 898-913.

Anonymous, "Pro/SHEETMETAL", http://web.archive.org/web/20050109152339/http://www.cad-resources.com/Pro-Sheetmelal-Lesson.pdf, pp. 1-3, 17-28, 49, 59, 92-97, 119, 125 pages.

* cited by examiner

| Name | Radius | Angle | K | Length |
|---|---|---|---|---|
| FR_BEND(4) | 1.0000 | 90.000 | 0.45 | 2.98 |
| FR_BEND(7) | 1.5000 | 90.000 | 0.45 | 3.75 |
| FR_BEND(0) | 2.3325 | 80.000 | 0.44 | 4.48 |
| FR_BEND(1) | 2.3325 | 80.000 | 0.44 | 4.48 |
| FR_BEND(2) | 2.3325 | 80.000 | 0.44 | 4.48 |
| FR_BEND(3) | 2.3325 | 80.000 | 0.44 | 4.48 |
| FR_BEND(5) | 2.5000 | 90.000 | 0.44 | 5.30 |
| FR_BEND(6) | 2.500 | 90.000 | 0.44 | 5.30 |

| Name | Radius | Angle | K | Length |
|---|---|---|---|---|
| FR_BEND(4) | 1.0000 | 90.000 | 0.45 | 2.98 |
| FR_BEND(7) | 1.5000 | 90.000 | 0.45 | 3.75 |
| FR_BEND(0) | 2.3325 | 80.000 | 0.44 | 4.48 |
| FR_BEND(1) | 2.3325 | 80.000 | 0.44 | 4.48 |
| FR_BEND(2) | 2.3325 | 80.000 | 0.44 | 4.48 |
| FR_BEND(3) | 2.3325 | 80.000 | 0.44 | 4.48 |
| FR_BEND(5) | 2.5000 | 90.000 | 0.44 | 5.30 |
| FR_BEND(6) | 2.500 | 90.000 | 0.44 | 5.30 |

| FR_BEND(0) | 2.3325 | 80.000 | 0.44 | 4.48 |

| | | | | |
|---|---|---|---|---|
| FR_BEND(0) | 2.3325 | 80.000 | 0.44 | 4.48 |
| FR_BEND(0a) | 2.3325 | 30.000 | 0.44 | 1.68 |
| FR_BEND(0b) | 2.3325 | 30.000 | 0.44 | 1.68 |
| FR_BEND(0c) | 2.3325 | 20.000 | 0.44 | 1.12 |
| FR_BEND(1) | 2.3325 | 80.000 | 0.44 | 4.48 |

NUMERICAL CONTROL ARRANGEMENT

CROSS-REFERENCE TO RELATED APPLICATIONS

This Application claims priority to pending Provisional U.S. Application Ser. No. 60/896,702, filed on Mar. 23, 2007, which application is incorporated herein by reference in its entirety. This application is related to U.S. Ser. No. 12/050,803, entitled "SYSTEM AND METHOD FOR DIRECT SHEET METAL UNFOLDING," filed on Mar. 18, 2008 (even date herewith).

TECHNICAL FIELD

The presently preferred embodiment of the innovations described herein relate generally to numerical control for machine tools. More specifically, the presently preferred embodiment relates to numerical control for machine tools that are controllable using a machining program with tool-related machining operations.

BACKGROUND

The progressive die industry is a pillar industry for automotive, consumer electronics, computer manufacture, etc. With the rapid changes of products in those industries, product companies need die and tooling capabilities with significantly shortened die tool lead time. Critical to the progressive die design is the ability to import a non-sheet metal filed into a CAD application, and then to be able to quickly convert it into a sheet-metal part for folding operations without any parameters from the original imported file. Once converted to a sheet-metal part, the user can then generate a flattened shape of a sheet metal part (or blank) and its intermediate states.

Unfolding of a sheet metal part is the first and most important step to design a progressive die. Unfolding methods vary based in part on different shapes of the sheet metal part. For example, for free-form sheet metal, one can make use of known CAE-FEM methods to perform unfolding. For a straight-break part, if it is an imported model or designed using generic features, one could convert it into sheet metal self-formable feature-based model. Known art includes the ability to re-build the part by using sheet metal features, another one is to re-build it automatically, the first method is very time-consuming and requires that a die designer have high sheet metal skill, other limitations exist where there are no "mapped" features.

What is needed is a numerical control arrangement not currently supported in the known prior art for direct sheet metal unfolding to support a bend neutral factor table and related fabrication thereof.

SUMMARY

To achieve the foregoing, and in accordance with the purpose of the presently preferred embodiment as described herein, the present application provides a numerical control arrangement, comprising a sheet metal data file defining a part blank having a plurality of position elements from a processed design file; a machine controller comprising tool-related operations and control data from said sheet metal data file defining a plurality of position elements, the operations and position elements being associated with machining tasks; and a machine controlled by said machine controller to form a sheet metal part. The numerical control arrangement, wherein said sheet metal data file has a plurality of calculated bend parameters corresponding to a plurality of identified linear bends. The numerical control arrangement, wherein said calculated bend parameters includes one of a bend angle, an inside bend radius, and a part thickness. The numerical control arrangement, wherein said calculated bend parameters include an over-bend as necessary. The numerical control arrangement, wherein the numerical control arrangement provides numerical control of a machine tool and a robot.

Other advantages of the presently preferred embodiment will be set forth in part in the description and in the drawings that follow. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 9:
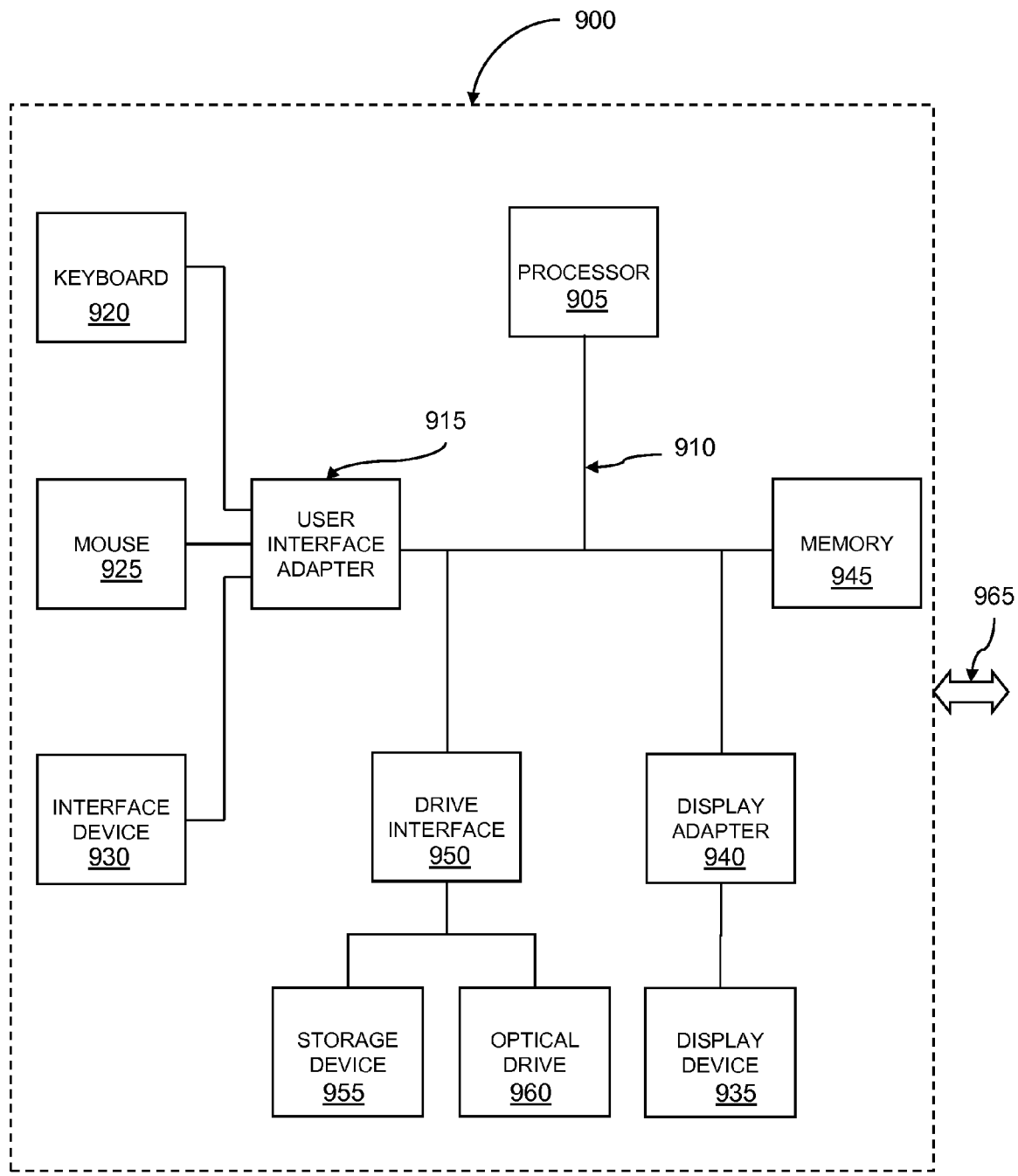
FIG. 9 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method directly recognize and unfold linear bends in a sheet metal part. Now therefore, in accordance with the presently preferred embodiment, an operating system executes on a computer, such as a general-purpose personal computer. FIG. 9 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 9, an exemplary system for implementing the presently preferred embodiment includes a general-purpose computing device in the form of a computer 900, such as a desktop or laptop computer, including a plurality of related peripheral devices (not depicted). The computer 900 includes a microprocessor 905 and a bus 910 employed to connect and enable communication between the microprocessor 905 and a plurality of components of the computer 900 in accordance with known techniques. The bus 910 may be any of several types of bus structures including a memory bus or memory controller, a peripheral bus, and a local bus using any of a variety of bus architectures. The computer 900 typically includes a user interface adapter 915, which connects the microprocessor 905 via the bus 910 to one or more interface devices, such as a keyboard 920, mouse 925, and/or other interface devices 930, which can be any user interface device, such as a touch sensitive screen, digitized pen entry pad, etc. The bus 910 also connects a display device 935, such as an LCD screen or monitor, to the microprocessor 905 via a display adapter 940. The bus 610 also connects the microprocessor 905 to a memory 945, which can include ROM, RAM, etc.

The computer 900 further includes a drive interface 950 that couples at least one storage device 955 and/or at least one optical drive 960 to the bus. The storage device 955 can include a hard disk drive, not shown, for reading and writing to a disk, a magnetic disk drive, not shown, for reading from or writing to a removable magnetic disk drive. Likewise the optical drive 960 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 900.

The computer 900 can communicate via a communications channel 965 with other computers or networks of computers. The computer 900 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 945 of the computer 900. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Numerical Control System

Figure 10:
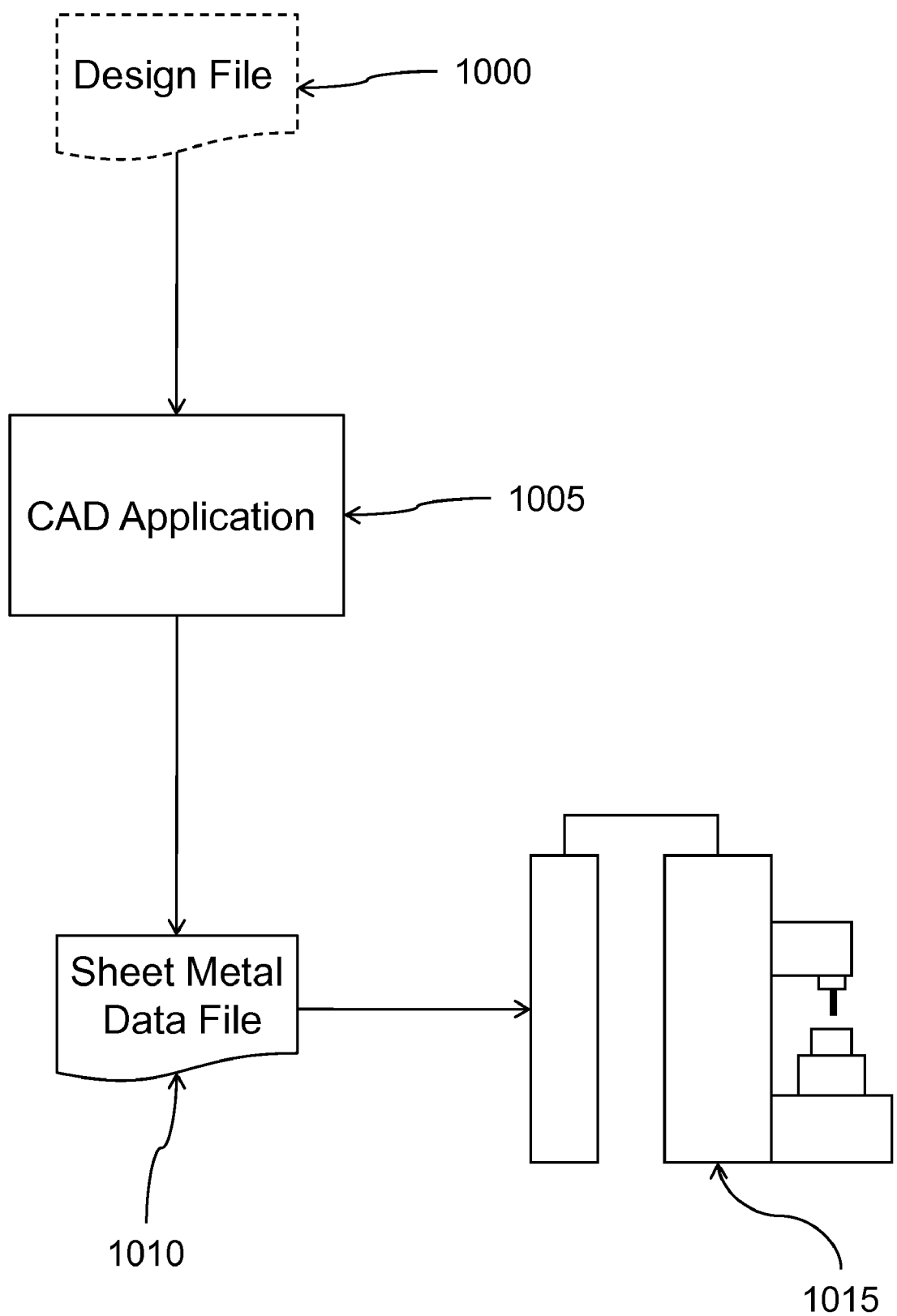
FIG. 10 depicts a system for a numerical control arrangement.

FIG. 10 depicts a system for a numerical control arrangement. Referring to FIG. 10, a designer (or user) intends to form a physical part from a design file 1000 for a solid model or other file that has at least some non-sheet metal part information contained therein. In an original form, the design file 1000 contains geometric and topologic information in a CAD application 1005. The designer initiates the processes described in more detail below to convert the design file 1000 into a sheet metal data file 1010. The sheet metal data file 1010 is typically in the necessary machine code to instruct a CNC machine 1015 to perform actions in a certain programmed manner. The CNC machine 1015 receives the sheet metal data file 1010 by way of a machine controller, where the machine controller translates the sheet metal data file 1010 into the necessary tool-related operations and control data information.

Figure 1:
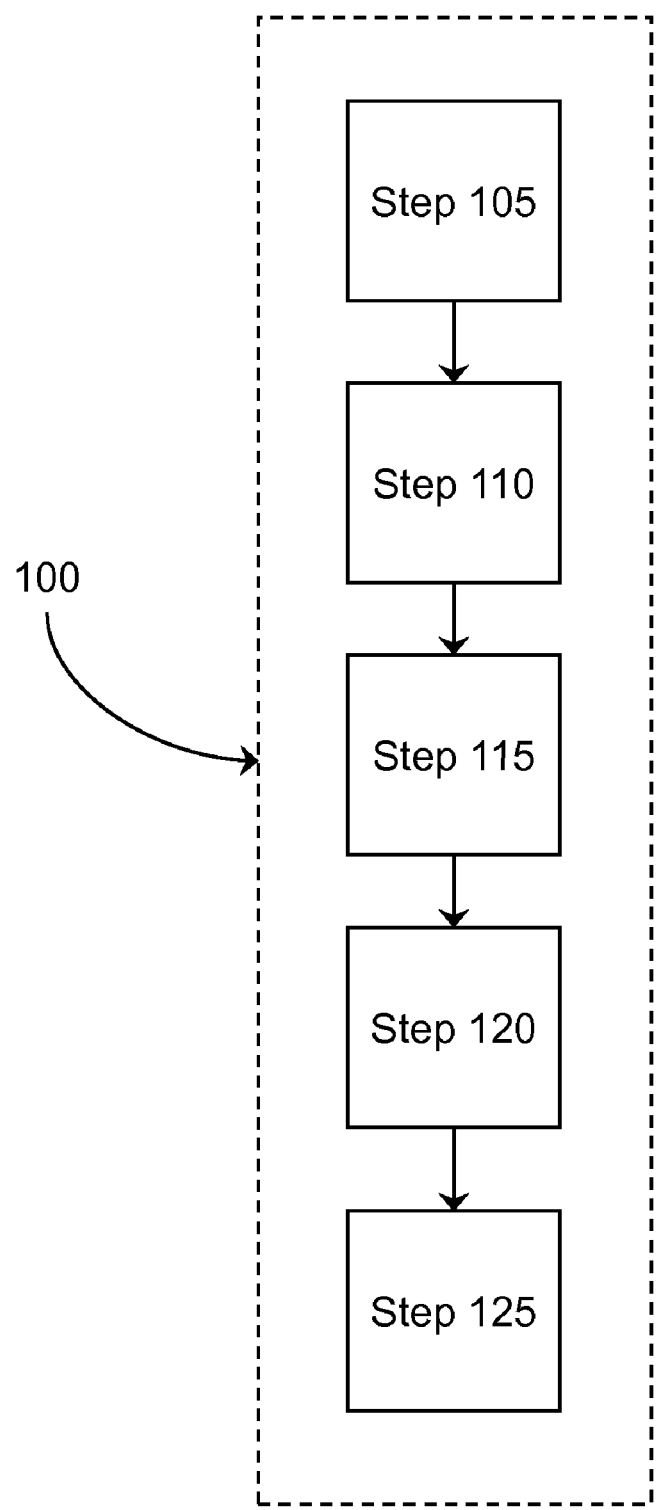
FIG. 1 is a logic flow diagram of the method employed by the presently preferred embodiment.

FIG. 1 is a logic flow diagram of a method employed by the presently preferred embodiment. Referring to FIG. 1, a computer implemented method 100 begins by selecting a planar face on a part design (Step 105). Next, a computer user identifies a number of linear bends associated with the planar face (Step 110) and then calculates a number of bend parameters corresponding to each of the identified linear bends (Step 115). A number of bend attributes are assigned to the corresponding bend parameters (Step 120), followed by converting the part design with the bend attributes to a sheet metal part (Step 125).

The methods of automatically unfolding a sheet metal part without prior knowledge or data defining the parameters or sheet metal features to get a part blank and associated intermediate stages in accordance with the presently preferred embodiment are set forth in more detail below.

Sheet Metal Unfolding

Step 0

The designer typically starts with either the design file 1000 created by a third party computer aided design (CAD) application 1005 or the designer intends to use the design file 1000 created with the CAD application 1005 in current use (also referred to as a native file) where the file lacks sufficient details necessary to accomplish a sheet metal fold. Utilizing techniques well understood in the art, the user imports the design file 1000 into the CAD application 1005 that can define a solid body or other part-state that lacks sufficient details to perform a sheet metal operation.

Step 1

Figure 2:
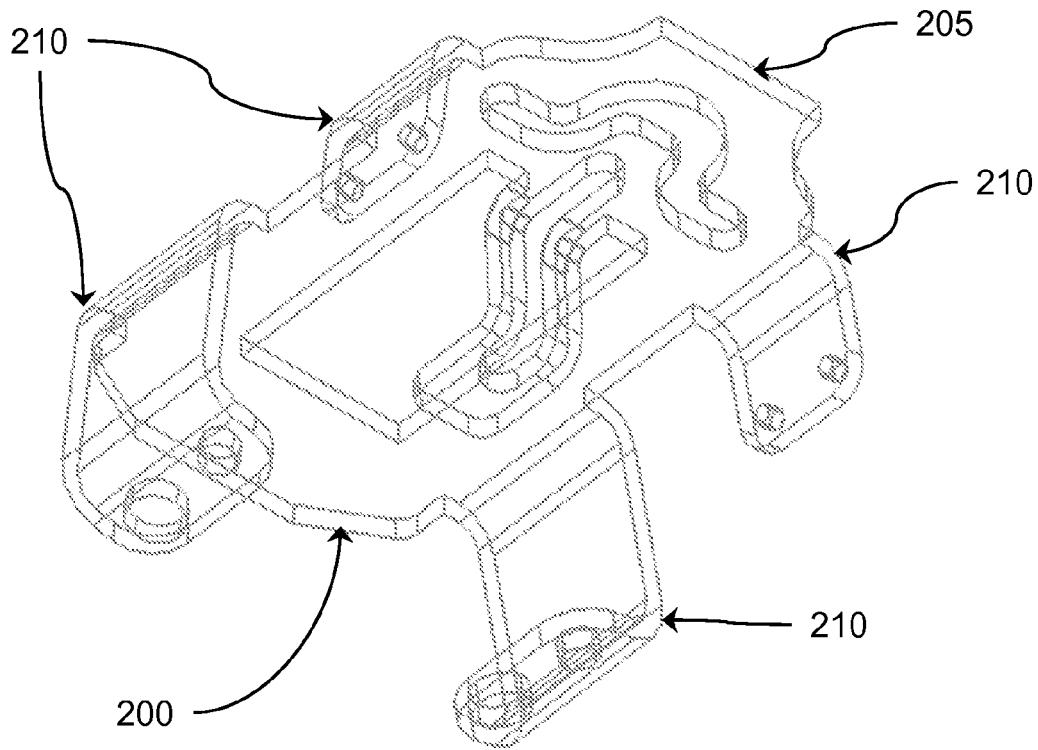
FIG. 2 is an orthographic view of a part design.

FIG. 2 is an orthographic view of a part design. Referring further to FIG. 2, once the design file 1000 is imported into the CAD application 1005, a part design 200 is displayed to the user utilizing known software techniques. The designer selects, for example, a planar face 205 on the part design 200 where at least a bend 210 is automatically recognized by the computer system programmed to execute the presently preferred embodiment (Step 110).

Step 3

Figure 3:
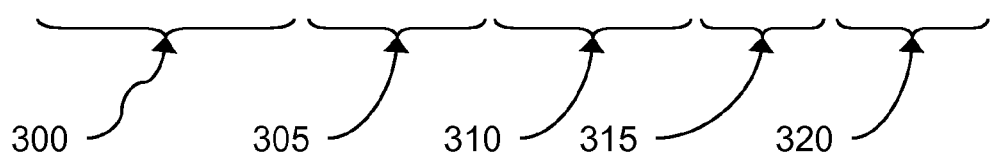
FIG. 3 illustrates a table view of displayed values of a part design.

FIG. 3 illustrates a table view of displayed values of a part design. The recognized bends 210 are identified and assigned a corresponding bend name 300. The corresponding bend names 300 are listed in a table format and have an associated inside bend radius value 305, a bend angle value 310, a k-factor value 315, and a development length value 320 (Step 115). The K-factor is well understood in the art of sheet metal bending and depends upon the material, the type of bending operation, the ratio of the inner bend radius to metal thickness. The developed length is also well known and understood in the art of sheet metal bending, according to the following formula: $L=(r+kt)\times\theta$, where r=inside bend radius, k=k-factor, t=material thickness, and $\theta$=bend angle in radians.

Step 4

Now that the necessary attributes of the recognized bends related to the part design are identified (Step 120), the part design 200 is converted into a sheet metal part as understood and known by the native CAD application (Step 125). The sheet metal part conversion is well understood in the CAD industry and will not be discussed further with the understanding that the presently preferred embodiment assigns the necessary bend attributes to the associated bend faces so that the recognized bends are identified and properly utilized in a downstream unbend/rebend operation of the CAD application.

Optional Steps

Figures 4, 5:
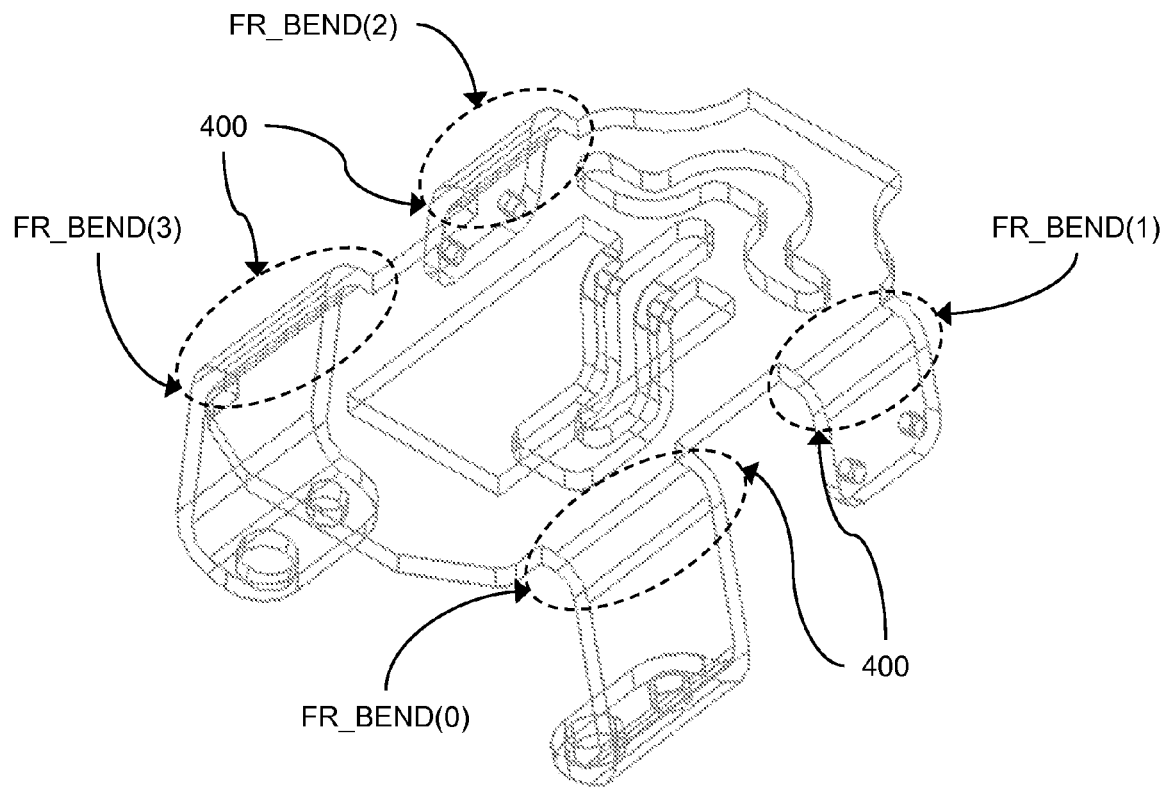
FIG. 4 illustrates an orthographic view of a part design with merged coaxial bends.
FIG. 5 illustrates a table view of displayed values of a part design with merged coaxial bends.

FIG. 4 illustrates an orthographic view of a part design with merged coaxial bends. Referring to FIG. 4, optionally at this stage the designer can identify a plurality of coaxial bends 400. The coaxial bends 400 that share the same inside bend radius and bend angle are merged into a single merged bend having a common point of control. The merged condition of the coaxial bends 400 is viewable as a plurality of merged coaxial bend values 500 in a table view of displayed values of a part design with merged coaxial bends, as illustrated in FIG. 5.

Figures 6, 7:
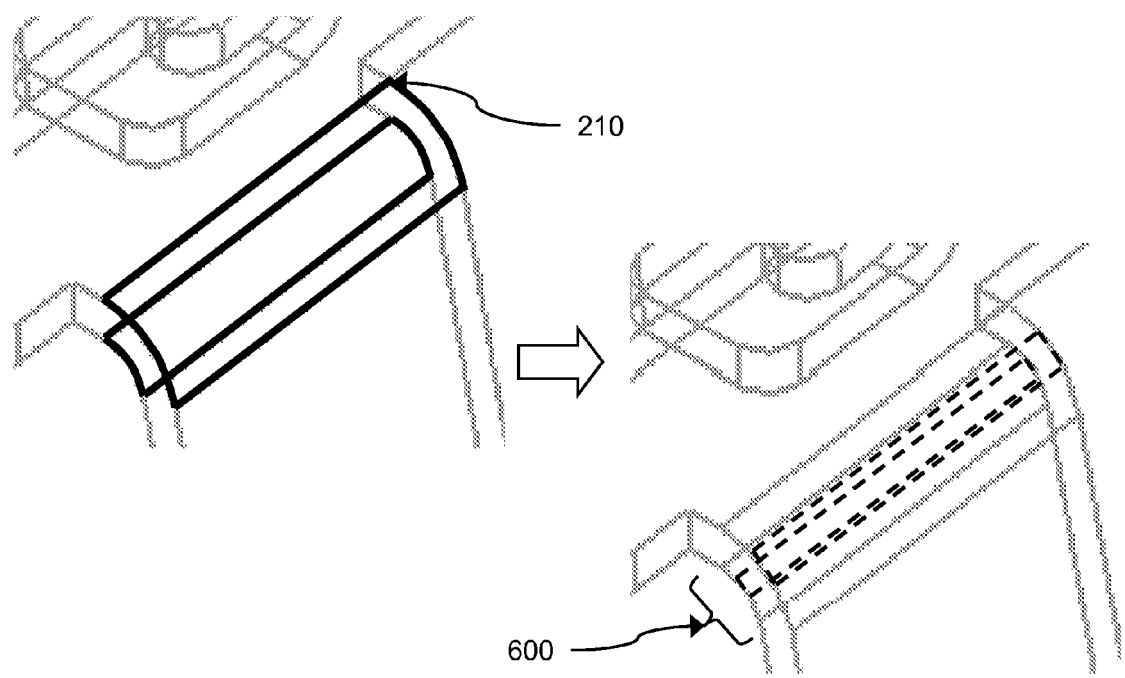
FIG. 6 illustrates an orthographic view of a part design with multi-step bends.
FIG. 7 that is a table view of displayed values of a part design with multi-step bends.

FIG. 6 illustrates an orthographic view of a part design with multi-step bends. Referring to FIG. 6, the designer also has the option to define a number of multi-step bends 600 from the recognized bends 210, by selecting the number of pre-bends and corresponding angle for each pre-bend. Pre-bends are included, for example, to resist spring-back that may occur based upon the chosen material of the part design 200, such spring-back may occur, for example, when forming an 80 degree bend may cause the final shape to incorrectly result as 75 degrees. FIG. 7 illustrates a table view of displayed values of a part design with multi-step bends. Referring to FIG. 7, if multiple pre-bends are defined, for example, as two pre-bends of 30 degrees and one of 20 degrees, so that the material will form and harden gradually so that the final shape will be precisely 90 degrees, those multiple pre-bends will occur.

The designer also has the option to define an over bend for any of the recognized bends. The designer may define the over bend by either angle or radius (among others), for example, defining a 90 degree bend that may have a final shape of 83 degrees because of 7 degrees of material spring back. Example methods to accomplish the over-bend technique include keeping the bend radius constant with the change of the bend angle so that the bend region will change accordingly; and maintaining a constant bend region, resulting in the bend radius changes when the bend angle is changed accordingly.

Step 5

Figure 8:
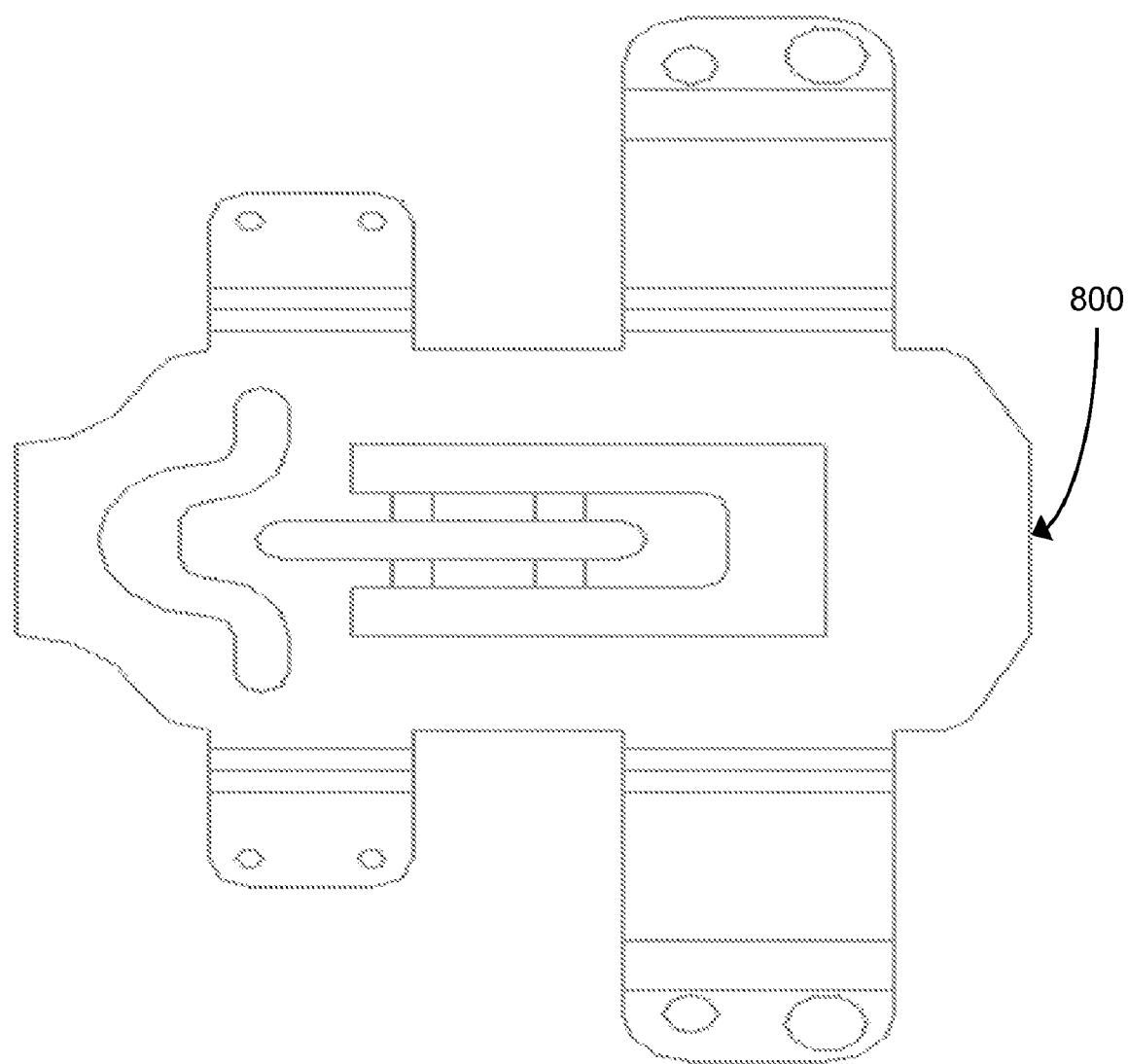

FIG. 8 illustrates a two-dimensional view of a part design. Referring further to FIG. 8, the designer creates a blank view 800 in a flattened status by executing an unfold command on the sheet metal part and making use of the unbending operation available to the CAD program utilizing techniques commonly understood in the art. Alternatively, rather than creating the blank that is flat, the designer can unfold the sheet metal part into any intermediate status where only selected recognized bends are subjected to the unbend operation.

CONCLUSION

From Step 1 through Step 5, the presently preferred embodiment has disclosed complete solution to directly and automatically uniform an un-parameterized model to enable generation of an associative blank or intermediate shape for a sheet metal part. Now that the designer has created either the blank or the intermediate status, the sheet metal part is outputted as an individual blank part for use in the CAD application or other known way to utilize sheet metal parts. Alternatively, the solid body of any of the bends in the intermediate status may be extracted as an intermediate stage for use in the CAD application or other known way to utilize sheet metal parts.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment, such as the ability to apply the over-bend feature to multiple bends at one time. Also it is contemplated that the recognition of bends occurs on not only an imported file from another CAD system, but also on any solid model with or without feature/parameters. Therefore, other implementations are within the scope of the following claims.

What is claimed is:

1. A numerical control arrangement, comprising:
    a sheet metal data file defining a part blank, the sheet metal data file having a plurality of position elements associated with machining tasks and having at least one bend defined by a plurality of pre-bends, each pre-bend in the plurality of pre-bends having an associated bend angle that is a portion of a total bend angle of the one bend;
    a machine controller having tool-related operations and control data from said sheet metal data file, the operations associated with machining tasks; and
    a machine controlled by said machine controller to form a physical part.

2. The numerical control arrangement of claim 1, wherein said sheet metal data file has a plurality of calculated bend parameters corresponding to a plurality of identified linear bends.

3. The numerical control arrangement of claim 2, wherein said calculated bend parameters includes one of a bend angle, an inside bend radius, and a part thickness.

4. The numerical control arrangement of claim 2, wherein said calculated bend parameters include an over-bend.

5. The numerical control arrangement of claim 1, wherein the numerical control arrangement provides numerical control of a machine tool and a robot.

6. The numerical control arrangement of claim 4, wherein the over-bend is calculated based on properties for spring back of a material of the sheet metal part.

7. A method, comprising:
receiving a design file for a sheet metal part in a computer;
recognizing at least one bend by the computer;
creating, by the computer, a sheet metal data file corresponding to the design file, the sheet metal data file defining the at least one bend by a plurality of pre-bends, each pre-bend in the plurality of pre-bends having an associated bend angle that is a portion of a total bend angle of the one bend; and
storing the sheet metal data file for use by a computed numerically controlled (CNC) machine to create the sheet metal part.

8. The method of claim 7, wherein said sheet metal data file has a plurality of calculated bend parameters corresponding to a plurality of bends recognized by the computer.

9. The method of claim 8, wherein said calculated bend parameters includes one of a bend angle, an inside bend radius, and a part thickness.

10. The method of claim 8, wherein said calculated bend parameters include an over-bend.

11. The method of claim 7, wherein the wherein the CNC machine is one of a machine tool and a robot.

12. The method of claim 7, further comprising creating the sheet metal part using the CNC machine, including performing the plurality of pre-bends to produce the at least one bend.

13. The method of claim 10, wherein the over-bend is calculated based on properties for spring back of a material of the sheet metal part.

* * * * *